(12) United States Patent　　(10) Patent No.:　US 12,605,837 B2
Souyris et al.　　　　　　　　　(45) Date of Patent:　Apr. 21, 2026

(54) COLLABORATIVE DELTA ROBOT

(71) Applicant: DEMAUREX SA, Ecublens (CH)

(72) Inventors: Frank Souyris, Belmont sur Lausanne (CH); Victor Jung, Pully (CH); Christian Vouillamoz, Fully (CH)

( * ) Notice: Subject to any disclaimer, the term of this patent is extended or adjusted under 35 U.S.C. 154(b) by 621 days.

(21) Appl. No.: 17/912,075

(22) PCT Filed: Oct. 5, 2021

(86) PCT No.: PCT/EP2021/077455
§ 371 (c)(1),
(2) Date: Apr. 13, 2023

(87) PCT Pub. No.: WO2023/057050
PCT Pub. Date: Apr. 13, 2023

(65) Prior Publication Data
US 2024/0208063 A1　　Jun. 27, 2024

(51) Int. Cl.
B25J 9/16　　　　(2006.01)
B25J 5/00　　　　(2006.01)
B25J 15/06　　　(2006.01)

(52) U.S. Cl.
CPC ............. B25J 9/1676 (2013.01); B25J 5/007 (2013.01); B25J 9/1623 (2013.01); B25J 9/1697 (2013.01); B25J 15/0616 (2013.01)

(58) Field of Classification Search
CPC ........ B25J 9/1676; B25J 5/007; B25J 9/1623; B25J 9/1697; B25J 15/0616; B25J 9/1666;

(Continued)

(56) References Cited

U.S. PATENT DOCUMENTS

| | | | |
|---|---|---|---|
| 2018/0222052 A1* | 8/2018 | Vu | ........................... G01S 17/04 |
| 2020/0094415 A1* | 3/2020 | Xi | ........................... B25J 9/1612 |

(Continued)

FOREIGN PATENT DOCUMENTS

EP　　　　0474881 A1　　3/1992

OTHER PUBLICATIONS

"Wyzo, Introducing Wyzo, May 20, 2021, Youtube, https://www.youtube.com/watch?v=6pdZOA1GHwo") (Year: 2021).*

(Continued)

*Primary Examiner* — Hunter B Lonsberry
(74) *Attorney, Agent, or Firm* — Tucker Ellis LLP

(57) ABSTRACT

The present invention relates to a collaborative Delta robot (1) comprising a stationary base (2) and a mobile basket (3) connected to the base (2) by means of three kinematic chains (4, 5, 6), where each kinematic chain is driven by its own motor (7), characterized in that the robot comprises first means (8) for detecting the presence of an object or a living being in a first safety zone around the robot, in that the robot comprises means for detecting contact between one of the kinematic chains (4, 5, 6) or the basket (3) with an object or living being, and in that the robot comprises a motor control unit configured to reduce the speed of the motors from a first speed to a second speed when an object or living being is detected in the first safety zone and to stop the motors when contact between a kinematic chain (4, 5, 6) or the basket (3) with an object or living being is detected.

17 Claims, 1 Drawing Sheet

(58) Field of Classification Search
CPC .......... B25J 19/06; G05B 2219/37624; G05B 2219/40201; G05B 2219/40267; G05B 2219/40624; G05B 2219/49158
See application file for complete search history.

(56) References Cited

U.S. PATENT DOCUMENTS

2020/0281670 A1*  9/2020  Moskowitz ............ A61B 34/30
2024/0131715 A1*  4/2024  Krieg ..................... F16P 3/147

OTHER PUBLICATIONS

W0 2012/122633 , Sutherland, Stephen pp. 8-10 (Year: 2021).*
International Search Report and Written Opinion issued in PCT/EP2021/077455 mailed Jun. 14, 2022, 15 pages.
Anonymous: "Wyzo-side-bot-redefining-delta-technical-specifications-Wyzo," May 16, 2021, XP055927433 URL:https://web.archive.org/web/20210516181533/https://thewyzo.com/technical-specifications/ Accessed Jun. 2, 2022.
Wyzo: "Introducing Wyzo," May 20, 2021, XP055927466 URL:https://www.youtube.com/watch?v=6pdZ0A 1 GHwo Accessed Jun. 2, 2022.
Sami Haddadin et al: "Robot Collisions: A Survey on Detection, Isolation, and Identification," IEEE Transactions on Robotics., vol. 33, No. 6. Dec. 1, 2017. pp. 1292-1312. XP055434488, ISSN: 1552-3098, DOI: 10.1109/TR0.2017.2723903.

* cited by examiner

COLLABORATIVE DELTA ROBOT

TECHNICAL FIELD OF THE INVENTION

The present invention relates to the field of parallel robots, in particular to the field of Delta robots.

PRIOR ART

Industrial robots have become more and more popular with individuals and companies; they are particularly in demand for handling small objects that require fast, high-precision movements, notably for product packaging operations, especially for small and fragile products, such as cookies for example.

This market demand has been effectively met by the development of robotic arms, which are well-known in the prior art.

Delta robots have applications in various industries, for example in the food and pharmaceutical industries. The robots are placed on top of production lines that comprise conveyors or conveyor belts which transport goods and perform various operations to collect and transport products to boxes or containers. Delta robots consist of a base and at least three motors that are normally placed equidistantly. The motors are designed to drive three kinematic chains allowing the movement of a basket which generally comprises a gripper for handling objects. Delta robots are specifically designed to maximize the speed and versatility of high-speed small part handling and picking operations across a range of industries, including food, pharmaceuticals, and electronics. Their unique parallel-link structure and work envelope make them ideal for automating demanding applications that traditional serial-link robots are unable to perform.

Although the Delta robots known in the prior art are extremely useful and fast, they do not allow for collaboration with users. The high-speed movement of the kinematic chains and the basket represents a danger to a user in the vicinity. Nevertheless, that user would welcome the possibility of such collaboration. This would make it possible, for example, to implement Delta robots in open production lines where users could intervene to, for example, control the quality of the products or to perform maintenance tasks. At present, the safety of users cannot be guaranteed merely by placing robots in specific enclosures. These enclosures take up a lot of space and result in large production lines that prevent real collaboration between the robot and the users.

There is therefore a need for a Delta robot that allows collaboration with users while ensuring maximum safety.

SUMMARY OF THE INVENTION

Therefore, an aim of the present invention is to provide an inventive Delta robot to overcome the previously mentioned limitations.

According to the invention, these aims are achieved by the objects of the independent claim. More specific aspects of the present invention are described in the dependent claims as well as in the description.

More specifically, an aim of the invention is achieved by a collaborative Delta robot comprising a stationary base and a mobile basket connected to the base by means of three kinematic chains, each kinematic chain being driven by its own motor, wherein the robot comprises first means for detecting the presence of an object or a living being in a first safety zone around the robot, wherein the robot comprises means for detecting contact between one of the kinematic chains or the basket with an object or living being, and wherein the robot comprises a motor control unit configured to reduce the speed of the motors from a first speed to a second speed when an object or living being is detected in the first safety zone and to stop the motors when contact between a kinematic chain or the basket with an object or living being is detected.

With such a Delta robot, safety is guaranteed while allowing collaboration between the robot and users in the vicinity. Thanks to the first means for detecting the presence of an object or a living being in the first safety zone around the robot and to the motor control unit, it is possible to reduce the speed of the robot's motors and thus the speed of movement of the kinematic chains, when a living being and/or an object is detected in the vicinity of the robot. Moreover, thanks to the means for detecting contact between one of the kinematic chains or the basket with an object or a living being and to the motor control unit, it is possible to stop the movement of the kinematic chains and the basket as soon as contact is detected. This allows robots to be placed close to live users without compromising their safety. The robots according to the present invention can therefore be integrated into production lines close to each other, thus reducing the length of the production line. In addition, robots no longer need to be isolated in their own enclosures to ensure safety.

In a first preferred embodiment of the present invention, the robot comprises second means for detecting the presence of an object or living being in a second safety zone around the robot, the second safety zone being smaller than and included within the first safety zone and wherein the motor control unit is configured to reduce the speed of the motors from the second speed to a third speed when an object or living being is detected in the second safety zone. This further increases safety because the speed can be further reduced when an object or living being is detected in the second safety zone, i.e., in the immediate vicinity of the robot.

In another preferred embodiment of the present invention, the motors are direct drive motors. The fact that the motors are direct drive, i.e., there is no gearbox, and that they are particularly compact for the torque that can be produced, allows for immediate detection of contact and an immediate stop to the motors, i.e., in less than 50 ms, advantageously in less than 10 ms, in particular in less than 2 ms, upon the detection of contact between one of the kinematic chains or the basket with a living being or an object. This increases the safety of the robot. The motors of the robot according to the present invention are advantageously configured to achieve a higher specific torque (torque to mass) and a higher torque density (torque to volume) than other known collaborative robot motors. In particular, the motors of the robot of the present invention are configured to achieve a specific torque of at least 2 N-m/kg, advantageously at least 3 N-m/kg.

The robot according to the present invention is a collaborative robot intended to work in close proximity to people without a physical safety barrier between the robot and the people. Unlike delta robots which normally use motors with gearboxes, the motors of the robot of the present invention are advantageously direct drive motors with reduced inertia. The combination of direct drive and reduced inertia allows the robot to stop more quickly, reducing the risk of injury to a person working near the robot. The motors of the robot of the present invention are advantageously configured to achieve a torque density of at least 1,000 N-m/kg-m$^2$, advantageously at least 2,000 N-m/kg-m$^2$, even more advantageously at least 3,000 N-m/kg-m$^2$.

In another preferred embodiment of the present invention, the first and/or second means for detecting the presence of an object or living being are safety laser scanners or other optoelectronic protective devices such as optoelectronic sensors, cameras or light or beam barriers. Thanks to this, the detection of an object or a living being can be done accurately. These means can be advantageously configured to detect the presence of an object or a living being in a horizontal plane, favorably at the height of an adult's knees. However, it is also possible to provide means configured to detect a presence in a vertical or oblique plane or in an extended range.

In addition, these means can be configured to detect whether the object or living being is approaching or moving away from the robot. When it is detected that the object or living being is moving away from the robot but is within the first safety zone, the speed of the robot motors can be safely increased. Advantageously, these means are configured to determine the relative speed of movement of an object or a living being with respect to the robot, in particular with respect to the kinematic chains and/or the basket. This allows the robot speed to be adjusted accordingly.

In another preferred embodiment of the present invention, the means for detecting contact between one of the kinematic chains or the basket with an object or living being comprise means for determining and comparing the torque exerted by each of the motors to a torque threshold. This ensures that contact is reliably detected and the robot is stopped. Indeed, when the torque applied by one or more motors is greater than or equal to an advantageously predefined torque threshold, the robot has come into contact with an obstacle and the robot must be stopped for safety reasons.

In another preferred embodiment of the present invention, the means for detecting contact between one of the kinematic chains or the basket with an object or living being comprise means for determining and comparing the speed of the motors to a speed threshold. This allows for reliable detection of unexpected robot behavior. Indeed, when the speed of one or more motors is greater than or equal to an advantageously predefined speed threshold, the robot is performing unplanned movements and must be stopped to limit the contact energy in order to avoid injuring a person and thus to increase safety.

In another preferred embodiment of the present invention, the means for detecting contact between one of the kinematic chains or the basket with an object or living being comprise means for determining and comparing the position of each kinematic chain and of the basket with an intended position. This increases safety by detecting contact between the robot and a user or an object.

In another preferred embodiment of the present invention, the motor control unit is configured to stop the motors if the determined torque is greater than the torque threshold, and/or if the determined speed is greater than the speed threshold and/or if the position of a kinematic chain or the basket is not equal to the intended position.

In a following preferred embodiment of the present invention, the stationary base is attached to a mobile frame. This allows the robot to be moved to the exact location where it is required. This is particularly useful when integrating the robot into a production line. The position of the robot can thus be adapted to the precise, current requirements associated with the production line.

In another preferred embodiment of the present invention, the frame comprises wheels, advantageously retractable wheels, for moving the robot. This makes it easy to move the robot. Advantageously, the robot comprises a motor, for example an electric motor, to drive the wheels. The robot can thus move itself to the requested position. In such a case, it is favorable to provide a robot that comprises batteries to power the motor.

In yet another preferred embodiment of the present invention, the robot comprises a command unit for commanding the control unit, the command unit comprising a graphical interface allowing the user to program the movement of the basket. Thanks to the graphical unit, the movements of the platform can be easily programmed without any knowledge of programming languages. The graphical interface is advantageously tactile and/or mobile.

In a following preferred embodiment of the present invention, the command unit allows the size of the first safety zone and/or the second safety zone and/or the torque threshold value and/or the speed threshold value to be configured. This makes it possible to adapt the values of these parameters to the environment in which the robot is placed.

In another preferred embodiment of the present invention, the command unit allows the first speed, the second speed and/or the third speed to be configured. This makes it possible to adapt the speeds to the environment in which the robot is placed.

In a following preferred embodiment of the present invention, the control unit is configured to cause the motors to be driven at their maximum speed when no objects or living beings are detected in the first safety zone. In addition, the control unit is configured so that the robot reaches a maximum speed while ensuring sufficient safety when a living being or object is detected in the first safety zone. Sufficient safety is defined as meeting the ISO 15066:2016 (year 2021) standard which defines the maximum allowable contact pressure with various parts of the human body.

In another preferred embodiment of the present invention, the basket comprises means for removably attaching a gripper. This allows the robot to be used with a known, commercially available gripper.

In a following preferred embodiment of the present invention, the robot comprises means for creating a suction force by the gripper. This allows objects to be manipulated with the gripper.

In another preferred embodiment of the present invention, the frame comprises side legs configured to interact with a forklift. This allows the robot to be moved easily.

In yet another preferred embodiment of the present invention, the first and/or second means for detecting the presence of an object are mounted on the frame.

In another preferred embodiment, the means for detecting contact between one of the kinematic chains or the basket with an object or living being are redundant for each motor. This is particularly advantageous to ensure safety even if one of the means is defective. In particular, redundancy is achieved by providing at least two means per motor for determining and comparing the torque and speed of the motors, as well as the position of the kinematic chains and the basket. The cables connecting these means to the motor control unit are advantageously also at least doubled. The software in the motor control unit and in the command unit is advantageously designed to take this redundancy into account.

BRIEF DESCRIPTION OF THE DRAWINGS

The features and advantages of the present invention will become apparent in greater detail in the following description by way of an illustrative and non-limiting example of an embodiment with reference to the two attached drawings, in which.

DETAILED DESCRIPTION

Figure 1:
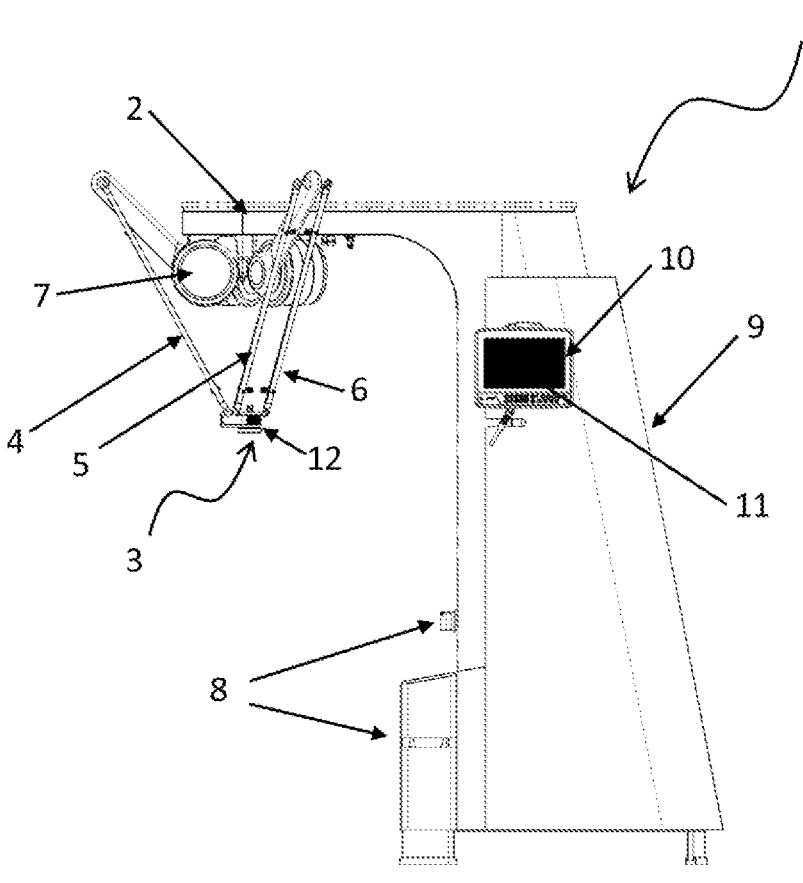
FIG. 1 shows a side view of a Delta robot according to one embodiment of the present invention.
Figure 2:
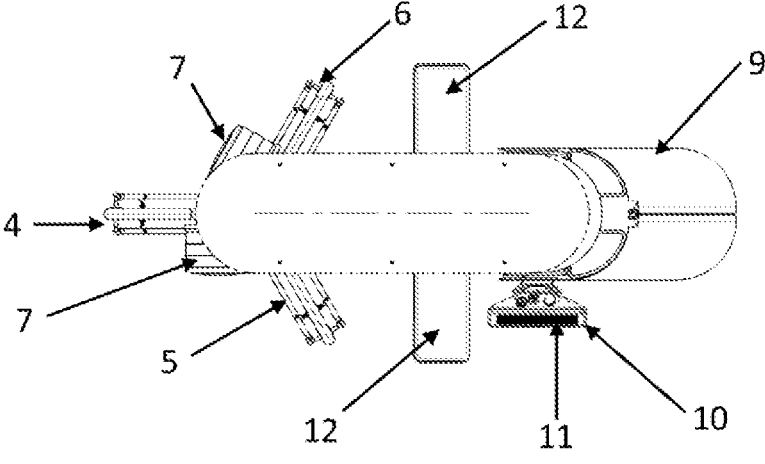
FIG. 2 shows a top view of the robot in FIG. 1.

FIG. 1 shows a side view and FIG. 2 shows a top view of a collaborative Delta robot 1 according to one embodiment of the present invention. The robot 1 comprises three kinematic chains 4,5,6 which allow the movement of the basket 3 relative to the fixed base 2. Each kinematic chain 4,5,6 has its own motor 7, advantageously a direct drive motor. The basket 3 is configured to removably receive a gripper 12 and advantageously comprises means (not shown) for applying a suction force by the gripper.

The robot 1 further comprises means 8 for detecting the presence of an object or living being in a first safety zone and/or a second safety zone, the second safety zone being smaller than and included within the first safety zone. The robot of FIGS. 1 and 2 comprises two means 8 placed at two different places on the frame 9, which makes it possible to detect the presence of an object or a human being in several zones. It is of course possible to provide only one means 8 or more than two means. It is important to note that additional means for detecting the presence of an object or living being may also be provided. These means can be, for example, optoelectronic sensors placed a distance away from the robot, which makes it possible to cover a different area and in particular blind spots not covered by the means mounted on the frame.

The robot 1 also comprises means (not shown here) for detecting contact between the kinematic chains or the basket with an object or living being. Advantageously, these means comprise a command unit dedicated to controlling the position and speed of the robot in a safe way, as well as to controlling the torque exerted by each motor on each joint. In particular, these means comprise means for determining and comparing the torque exerted by each motor to a torque threshold. These means can also be used advantageously to determine and compare the speed of each motor to a speed threshold. Finally, these means make it possible to determine and compare the position of each kinematic chain and of the basket with their intended position. When the exerted torque is greater than the torque threshold, or if the determined speed is greater than the speed threshold or if a deviation is determined between the robot position and the intended position, the motors are stopped by the motor control unit to ensure safety.

As can be seen in FIGS. 1 and 2, the robot comprises a command unit 10 configured to command a motor control unit 7. The command unit 10 comprises a graphical user interface 11 for "WYSIWYG" programming of the movement of the basket 3. The command unit also allows the user to enter the values of the torque threshold, the speed threshold and the value of the deviation between the determined position of the kinematic chains and the basket and the intended position that causes the motors to stop. Advantageously, the graphical interface is tactile.

The robot 1, more specifically the frame 9, comprises legs 12 that are configured to allow the robot to be transported by a forklift truck which allows the robot to be easily moved to the location where it is required. The robot could also comprise wheels for its movement which advantageously can be driven by one or more electric motors placed in the robot. Favorably, one or more batteries can be provided to power these motors.

It is obvious that the present invention is subject to many variations as to its implementation. Although a non-limiting embodiment has been described by way of example, it is understood that it is not conceivable to exhaustively identify all possible variations. It is, of course, possible to replace a described means by an equivalent means without going beyond the scope of the present invention. All these modifications are part of the common knowledge of a person skilled in the field of Delta robots.

The invention claimed is:

1. A collaborative Delta robot comprising:
   a stationary base and a mobile basket connected to the base by means of three kinematic chains, each kinematic chain being driven by its own motor,
   a first presence detector configured to detect an object or a living being in a first safety zone around the robot, and
   a motor control unit configured to reduce a speed of each said motor from a respective first speed to a respective second speed when an object or a living being is detected in the first safety zone and to stop the motors when contact between a said kinematic chain or the basket with an object or a living being is detected,
   wherein to detect contact between one of the kinematic chains or the basket with an object or a living being, the motor control unit is configured to:
   determine a torque exerted by each of the motors, and
   compare the determined torque of each motor to a torque threshold,
   wherein the motors are direct drive motors configured to achieve a torque of at least 2 N-m/kg.

2. The robot according to claim 1, further comprising a second presence detector configured to detect an object or living being in a second safety zone around the robot, the second safety zone being smaller than and included within the first safety zone, and wherein the motor control unit is configured to reduce the speed of each of the motors from the respective second speed to a respective third speed when an object or living being is detected in the second safety zone.

3. The robot according to claim 2, wherein the first and/or the second presence detectors are safety laser scanners or other optoelectronic protective devices.

4. The robot according to claim 1, wherein to detect contact between one of the kinematic chains or the basket with an object or a living being, the motor control unit is configured to:
   determine a speed of each of the motors, and
   compare the determined speed of each motor to a speed threshold.

5. The robot according to claim 1, wherein to detect contact between one of the kinematic chains or the basket with an object or a living being, the motor control unit is configured to:
   determine a position of each kinematic chain and the basket, and
   compare the determined position of each motor with an intended position.

6. The robot according to claim 1, wherein the motor control unit is configured to stop each of the motors if the determined torque for the respective motor is greater than the torque threshold, and/or if a determined speed of the respective motor is greater than a speed threshold and/or if a position of a kinematic chain or the basket is not equal to an intended position.

7. The robot according to claim 1, wherein the stationary base is attached to a mobile frame.

8. The robot according to claim 7, wherein the frame comprises wheels for moving the robot.

9. The robot according to claim 2, further comprising a command unit for commanding the motor control unit, the command unit comprising a graphical interface allowing a user to program a movement of the basket.

10. The robot according to claim 9, wherein to detect contact between one of the kinematic chains or the basket with an object or a living being, the motor control unit is configured to determine a torque exerted by each of the motors and compare the determined torque to a torque threshold, and wherein the command unit allows a size of the first safety zone and/or the second safety zone and/or the torque threshold value to be configured.

11. The robot according to claim 9, wherein the command unit allows the first speed, the second speed and/or the third speed to be configured.

12. The robot according to claim 1, wherein the motor control unit is configured to cause the motors to be driven at their maximum speed when no objects or living beings are detected in the first safety zone.

13. The robot according to claim 1, wherein the basket comprises means for removably attaching a gripper.

14. The robot according to claim 13, comprising means for creating a suction force by the gripper.

15. The robot according to claim 1, wherein the frame comprises side legs configured to interact with a forklift.

16. The robot according to claim 2, wherein the first and/or the second presence detectors are mounted on the frame.

17. The robot according to claim 1, wherein the motor control unit is configured to detect contact between one of the kinematic chains or the basket with an object or a living being redundantly for each motor.

\* \* \* \* \*